(12) United States Patent
Shima

(10) Patent No.: US 7,594,039 B2
(45) Date of Patent: Sep. 22, 2009

(54) IMAGE AND SOUND INPUT-OUTPUT CONTROL

(75) Inventor: Toshihiro Shima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 732 days.

(21) Appl. No.: 11/080,527

(22) Filed: Mar. 16, 2005

(65) Prior Publication Data

US 2005/0160198 A1 Jul. 21, 2005

Related U.S. Application Data

(62) Division of application No. 10/388,170, filed on Mar. 14, 2003, now Pat. No. 6,934,746.

(51) Int. Cl.
*G06F 3/00* (2006.01)
(52) U.S. Cl. ............... 710/8; 710/5; 710/72; 717/174; 718/1
(58) Field of Classification Search ............ 358/1.15, 358/1.9, 46, 257; 700/245; 703/6, 8; 705/26; 707/1, 101, 102, 103, 104, 3; 709/203, 204, 709/217, 220, 223, 229, 231; 710/36; 715/202, 715/207, 234, 255, 730; 725/91, 105
See application file for complete search history.

(56) References Cited

U.S. PATENT DOCUMENTS

| 6,182,116 | B1 | 1/2001 | Namma et al. | |
|---|---|---|---|---|
| 6,708,217 | B1 * | 3/2004 | Colson et al. | ............... 709/231 |
| 6,976,028 | B2 * | 12/2005 | Fenton et al. | ............... 707/102 |
| 2002/0004802 | A1 * | 1/2002 | Shima | ............... 707/513 |
| 2002/0073214 | A1 * | 6/2002 | Iinuma | ............... 709/229 |
| 2002/0116716 | A1 * | 8/2002 | Sideman | ............... 725/91 |

FOREIGN PATENT DOCUMENTS

| JP | 10-326288 A | 12/1998 |
|---|---|---|
| JP | 11-085654 A | 3/1999 |
| JP | 2000-315181 A | 11/2000 |
| JP | 2001-202317 A | 7/2001 |
| JP | 2001-258880 A | 9/2001 |
| JP | 2001-290695 A | 10/2001 |
| JP | 2002-057951 A | 2/2002 |
| WO | WO 02/15069 A1 | 2/2002 |

OTHER PUBLICATIONS

Apte, Web Services: A Java Developer's Guide Using E-Speak, 2001, Prentice Hall, pp. 1-8.*

* cited by examiner

*Primary Examiner*—Henry W. H. Tsai
*Assistant Examiner*—Cheng-Yuan Tseng
(74) *Attorney, Agent, or Firm*—Sughrue Mion, PLLC

(57) ABSTRACT

A home gateway 30, input devices, output devices and a client are connected via a network LAN. Installed into the home gateway 30 is a server-side program 100 for performing control of input devices and output devices, edit of image, and provision of an interface window to the client 10. Once the user specifies the devices to be used for input-output of image through the client 10, the server-side program 100, according to this specification, imports the image from the input device, transfers to the output device and causes the image to be output. This enables input-output of image to be achieved without installing a device driver.

7 Claims, 12 Drawing Sheets

IMAGE AND SOUND INPUT-OUTPUT CONTROL

This is a divisional of application Ser. No. 10/388,170 filed Mar. 14, 2003 now U.S. Pat. No. 6,934,746.

BACKGROUND OF THE INVENTION

1. Field of the Invention

This invention relates to a technique for performing input-output of image or sound between devices.

2. Description of the Related Art

In the prior art, images are generally printed in the following procedures. First, the image data to be printed is input from digital cameras, scanners, Web pages, etc., by user operations. Next, this image data is retouched if required. Finally, the retouched image data is output to a printer. These procedures are performed by respective software, for example: a device driver to import image data from a device such as digital cameras and scanners; retouching software to retouch the image data; and a printer driver for outputting the image data to the printer.

In the prior art, all of these types of software must be installed in order to achieve the series of procedures from input images to output images by printing. Thus, new software is required to be installed for every addition of a new device that is used for input-output of image, and new retouching software is required to be installed in order to perform new retouching. Installing new software consumes hardware resource of a computer and is a complex task, which may degrade convenience of input-output of images.

It is a serious problem for, in particular, users who are not familiar with computer that respective software is required to be used for each step of input-output. It imposes a substantial burden on these users to install all software and learn how to use it. Recently, the users unfamiliar with computer have been increasing, and thus it is desired to reduce such burden.

In the prior art, input-output of image is performed in the fixed order of "input-retouch-output." For example, the user can not specify only the retouching method or specify the printer used to print or the print mode prior to input of image. Thus, it is relatively difficult, for example, to sequentially replace one image with another image during printing a plurality of images after specifying the retouching method, print destination, etc., in advance.

The above problems may occur not only in input-output of images but also in input-output of sound. This invention addresses to these problems and thus purpose to improve convenience of input-output of images or sound.

SUMMARY OF THE INVENTION

In order to solve at least part of the above problems, the invention provides an input-output control device including components described below, thereby enabling input-output of audio-visual data between any of a plurality of devices that perform input-output of the audio-visual data for reproducing image or sound.

The input-output control device of the invention includes an input-output unit, an instruction input unit and an operation control unit. The input-output unit sends and receives audio-visual data and a command to and from each of individual functional units individually provided to operate the respective devices. The individual functional units need not necessarily be provided within the input-output control device. By way of example, they may be provided within another device connected with the input-output control device via a network. The individual functional units may be configured by driver software of the respective devices. The input-output unit sends and receives audio-visual data and commands to and from these individual functional units, thereby operating the respective devices and receiving the results of the operation.

The instruction input unit inputs selection instructions to select the individual functional unit respectively, which is used for one of a plurality of steps from input to output of the audio-visual data. Such selection instruction may be generated by manipulating the input-output control device or may be transferred in the form of file and the like from a peripheral device.

The operation control unit operates each of the selected individual functional units according to the plurality of steps. During that time, it transfers the audio-visual data that is output from one individual functional unit to another individual functional unit used for the next step. By way of example, it operates the individual functional unit selected for input in order to input the audio-visual data and transfers the received audio-visual data to the individual functional unit selected for output. This enables the series of processes from input to output to be achieved. The transferred data is preferably in a common format among the individual functional units but may be converted by the operation control unit according to a transfer destination.

According to the input-output control device of the invention, user can achieve input-output of audio-visual data only by selecting a device used for input and a device used for output. The software for operating each device is provided by the individual functional unit, and thus need not be individually installed by the user. Therefore, that can improve convenience in input-output of audio-visual data.

The invention can be utilized for various devices. In the case of image, the device for input includes, for example, a digital camera, a scanner and the like; and the device for output includes, for example, a printer, a display and the like. In the case of sound, the device for input includes, for example, a microphone; and the device for output includes, for example, various reproducers. In the broad sense, every device can be the device for input as long as the device can transfer the audio-visual data as digital data to the input-output control device. In the broad sense, every device can be the device for output as long as the device can be a destination to which the input-output device finally outputs the audio-visual data. In such point of view, the device for input and the device for output can also include followings: e.g., a Web server, a hard disk and the other storage medium.

Preferably, the input-output control device of the invention is further configured to be operative with including an individual functional unit for editing audio-visual data. This configuration enables audio-visual data to be edited. In the case of image, the individual functional unit for edit is implemented by retouching software. In the steps of input-output, it is applicable to select a plurality of individual functional units.

In the input-output control device of the invention, operation instruction specifying the operation of the respective individual functional unit may be input in addition to the selection instruction. Operation of the individual functional unit can be controlled by transferring a command corresponding to this operation instruction to the individual operation. By way of example, this enables operations as follows: setting the operation modes of the devices for input and output; and specifying parameters, which are used to edit, for the individual functional unit for edit. This configuration enables to achieve a variety of processes in each step of input-output.

Preferably, the input-output control device of the invention may be configured to specify the individual functional units in any order regardless of order of execution of the respective steps. By way of example, this configuration enables to readily replace the individual functional unit for input while the individual functional unit for output is fixed in advance. Thus, the settings in the respective steps can be readily diverted to another input-output.

In the input-output control device of the invention, preferably from a practical standpoint, the selection instructions are input through an interface window in which designations of the individual functional units for all of the respective steps are shown. Preferably, the operation instructions can be also shown. Such interface window is also useful to the case where the individual functional units can be specified in any order.

By way of example, the input-output control device of the invention can be configured by a Web server providing with an URL management unit, an interface-providing unit, and an operation control unit. These units can be configured with a server-side program, for example, CGI program, Servlet (trade mark) and the like. In this case, the user can operate each of the units by inputting the URL of Web page, which is provided by the Web server via the browser.

The URL management unit manages URLs (Uniform Resource Locators) used to invoke a plurality of applications to input audio-visual data and a plurality of applications to output said audio-visual data. The applications to be managed, including the device driver which controls the device for input or for output, can be configured with the server-side program, for example, CGI program, Servlet and the like.

The interface-providing unit provides a Web page as interface window to instruct the operation of the respective application. This interface window can be displayed by the browser. Preferably, each application has the capability to generate HTML data to specify the operation of the application itself and the interface window is generated by combining such HTML data. In addition, each application preferably creates an image file incorporated in the HTML data. The Web server can achieve a wide variety of interfaces by utilizing the URLs to invoke the applications for input and for output.

The operation control unit is as described above. The operation control unit can utilize URLs to invoke each application and thereby operate each application.

The configuration as such Web server enables to utilize the applications scattered on the network for input-output and further to perform instructions associated with input-output via the network.

The HTML data generated by each application may include a return link, which represents a link to the application itself. A parameter specified by the application itself is preferably added to this return link. By way of example, the return link may be attached to a button to specify the operation of the application, which is defined within the HTML data. When this button is clicked, the application itself can receive a request from the browser and receive the parameter attached to the button. Therefore, the application can detect the button having been selected and set the operation accordingly. Thus, utilizing the return links enables to generate the HTML data for setting the operation of the respective application independently on an application basis.

In the case where each application receives the request through the return link, the application preferably sets operation of itself based on the above parameter, and redirects the URL of the Web server for maintenance to the client. This enables the user to keep browsing the interface window provided by the Web server for management. Since it is possible to set the operation of the application without visible transition of interface window, it is possible to make the interface window more useful.

The URL, which is input into the browser to boot up the Web server of the invention, may include information to specify the application used for input-output and information to specify the operation of the application as parameters. The Web server is preferably configured to be able to interpret these parameters to specify the applications to be used and transfer the information specifying the operation of the application to the respective application. This enables to put together the information necessary for performing input-output in the invention into a single URL and to readily store these information by use of a function such as bookmark of the browser.

The invention may be configured as an application server which provides the application used by the above Web server. This application server is preferably configured to be capable of holding the setting of operation of itself and generating HTML data according to the setting. This HTML data can be used for providing the interface window by the Web server. This enables to readily provide the interface window on which the setting state of the operation is reflected.

In this case, it is preferable that the HTML data includes the return link described above and thus each application is able to update the setting according to the parameter included in the return link. This enables to achieve operation setting by the configuration particular to the application regardless of the configurations of the other application and the Web server.

As described above, the application preferably performs redirection to the Web server after updating the settings in response to the request based on this return link.

In the invention, all of the various features described above need not necessarily be provided, and thus it is possible to configure without a part of the features or in an appropriate combination of them. Furthermore, the invention is not limited to the aspects described above and is possible to be configured in a variety of aspects. By way of example, the invention may be configured as an input-output control device for performing input-output of audio-visual data between any of devices. Alternatively, the invention may be configured as a computer program for achieving functions of the input-output control device, the Web server and the application server described above, and as a computer-readable medium in which said computer program is stored. Such recording medium may include a variety of computer-readable media such as flexible disk, CD-ROM, DVD, magneto-optics disc, IC card, ROM cartridge, punched card, print with barcodes or other codes printed thereon, internal storage device (memory such as RAM and ROM) and external storage device of the computer and the like.

DESCRIPTION OF THE PREFERRED EMBODIMENTS

Embodiments of the invention are described as image input-output system in the following sequence.

Figure 1:
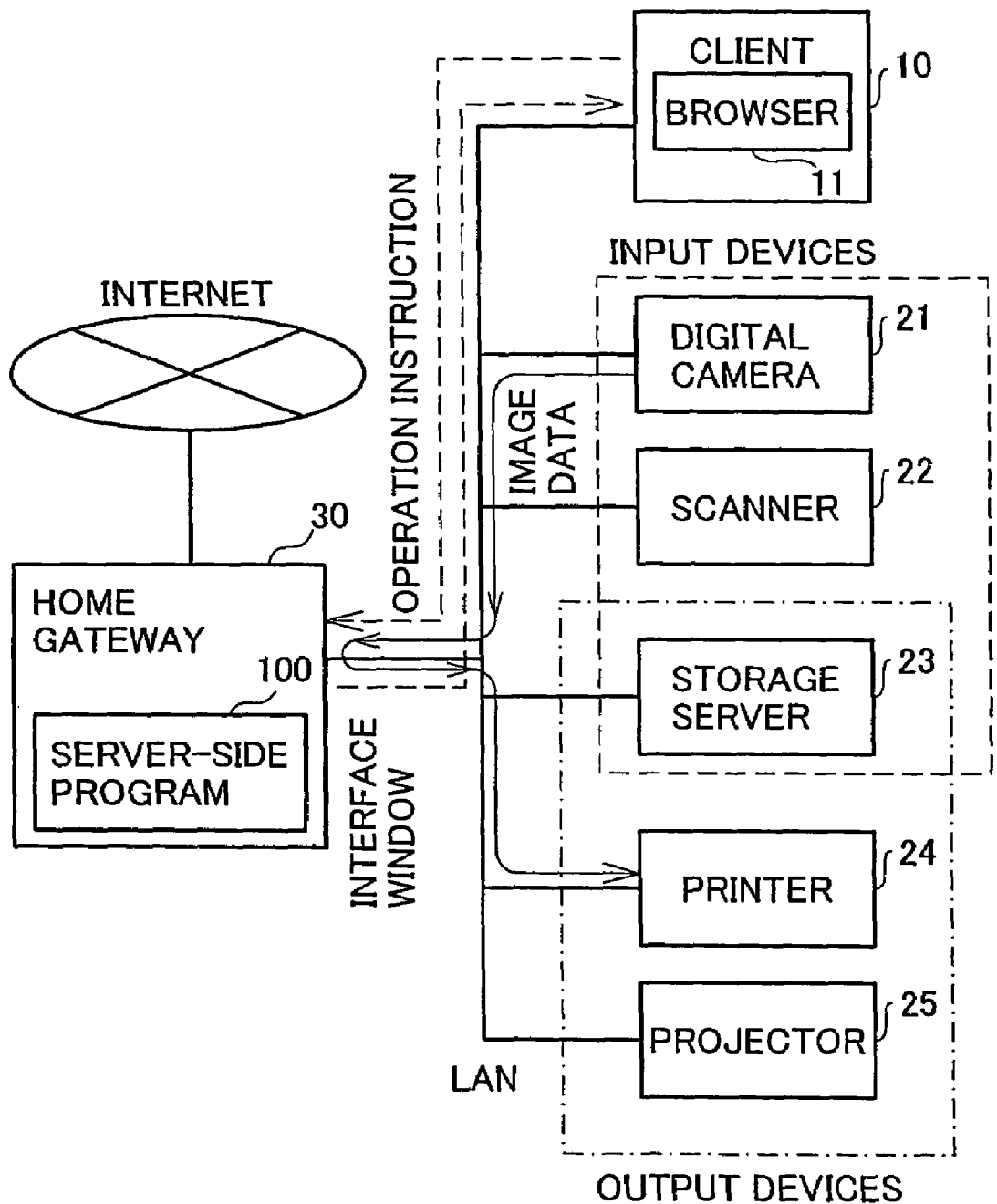
FIG. 1 is a schematic that shows a general configuration of an image input-output system as the embodiment.

A. Configuration of System
B. Configuration of Server-side Program
C. Interface Window
D. Generation of Interface Window
E. Holding of Settings
F. Effect
G. Modifications A. Configuration of System FIG. 1 is a schematic that shows a general configuration of an image input-output system as the embodiment. This system is configured by connecting each of devices to a home gateway 30 by a local area network LAN. The home gateway 30 is a device to connect the local area network LAN and the Internet. It includes CPU, RAM and ROM therein and is also able to run various programs. In this embodiment, the home gateway 30 is installed with modules supporting the HTTP protocol and also provides functions as a Web server. Furthermore, the home gateway 30 is installed with a sever-side program 100 to perform input-output of image. Detail of the sever-side program 100 is described later.

Connected to the local area network LAN are a client 10, input devices and output devices that are used by the user. Since the input devices and the output devices in FIG. 1 are exemplifications, all of these devices need not be included and another device may further be included.

In this embodiment, input devices include followings: a digital camera 21, a scanner 22 and storage server 23. Although the storage server 23 is not generating new image data but storing the image data that has been generated already, it can be regarded as an input device in that it provides image data to be output.

Output devices include followings: a printer 24, a projector 25 and the storage server 23. Although the storage server 23 is not visually outputting the image, it can be regarded as output device in that it can be a destination to which the image data is to be output.

The client 10 is a general-purpose computer having the capability of connecting to a network, and is installed with a browser 11 to browse Web pages. The browser 11 enables the user to browse the interface window provided by the server-side program 100. The user can make operation instruction such as specifying of the input device and the output device to be used for input-output of image through this interface window.

According to this operation instruction, the server-side program 100 operates the input device so as to acquire image data, and transfers the image data to the specified output device. Furthermore, the server-side program 100 controls this output device so as to output the image. By way of example, as shown in FIG. 1, the server-side program 100 acquires the image data from the digital camera 21, transfers the data to the printer 24 for printing. Such function is accomplished by software described below.

B. Component of Server-side Program

Figure 2:
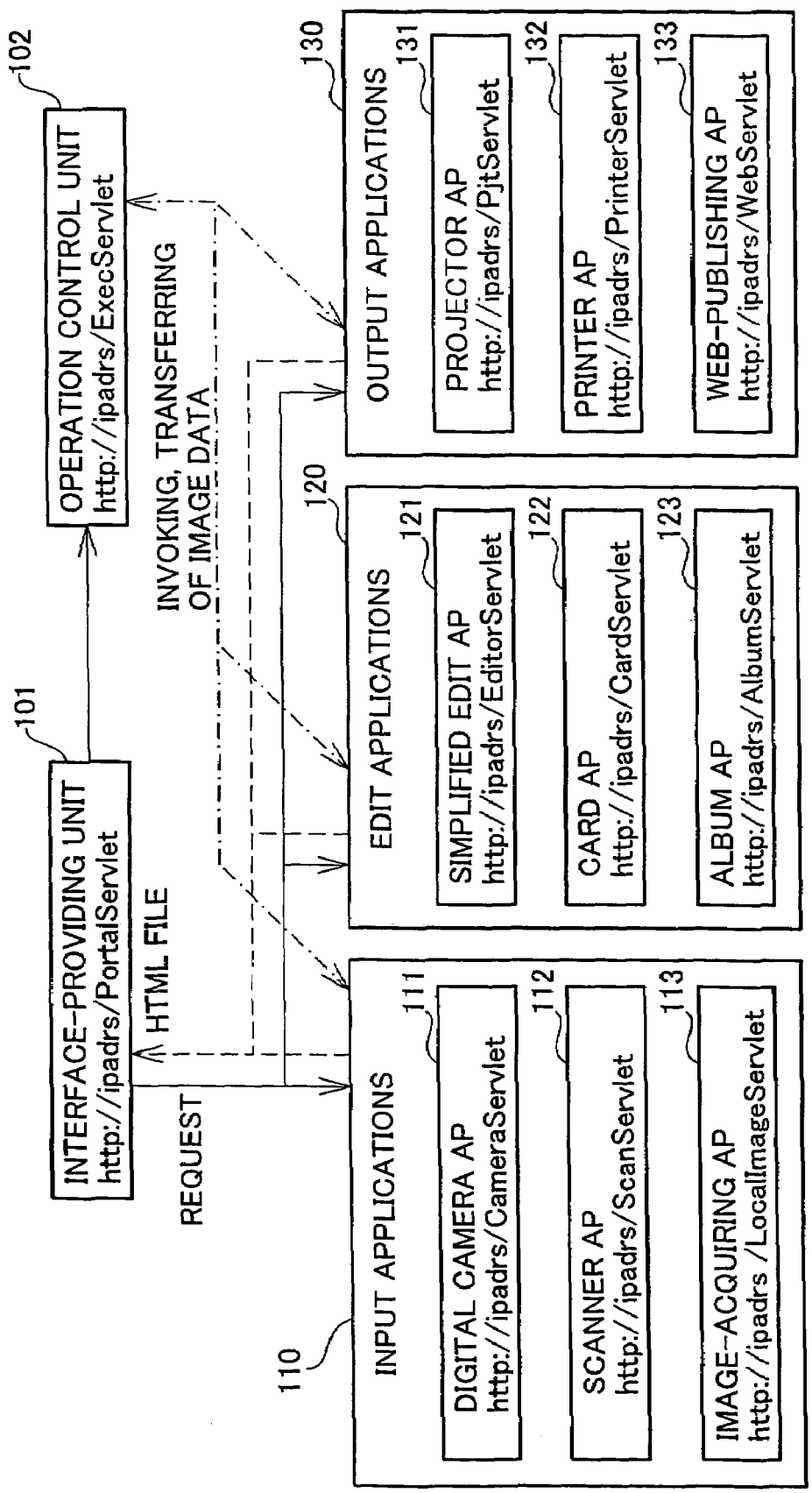
FIG. 2 is a schematic that shows functional blocks of a server-side program 100.

FIG. 2 is a schematic that shows functional blocks of a server-side program 100. In this embodiment, each functional block is configured by Servlet(trade mark) described primarily in JAVA(trade mark). Each of the functional blocks, to which URL (Uniform Resource Locator) is defined respectively, can be activated by a request that is sent to this URL from the browser and the like. The URLs of the respective functional blocks shown in FIG. 2 are exemplifications for sake of explanation, and the settings of URLs are not limited to these. Each of the functional blocks may be configured by not only Servlet but also CGI program and the other programming techniques, or may be configured as hardware.

An input application 110 is a set of control programs to operate input devices. A digital camera application 111 (hereinafter referred to as "digital camera AP") functions to acquire an image from the digital camera 21 via the local area network LAN. A scanner application 112 (hereinafter referred to as "scanner AP") functions to control the scanner 22 so as to acquire an image. An image-acquiring application 113 (hereinafter referred to as "image-acquiring AP") functions to acquire an image from the storage server 23. In this embodiment, the images are acquired in the JPEG(trade mark) format respectively.

An Edit application 120 functions to receive an image in the JPEG format, perform the specified edit, and output the image. In this embodiment, the edited image is also output in the JPEG format. A simplified edit application 121 (hereinafter referred to as "simplified edit AP") performs the simplified edit as follows: superimposing the prepared frame on the image, and altering the image size. A card application 122 (hereinafter referred to as "card AP") functions for creating a New Year's card, a Christmas card, a calendar and the like by use of prepared templates. An album application 123 (hereinafter referred to as "album AP") functions for creating a simplified album in the prepared forms.

An output application 130 is a set of control programs to receive the image data and outputting the data to the output devices. A projector application 131 (hereinafter referred to as "projector AP") operates the projector 25 so as to display the received image data. A printer application 132 (hereinafter referred to as "printer AP") operates the printer 24 so as to print the received image data. A Web-publishing application 133 (hereinafter referred to as "Web-publishing AP") functions to store the received data into the server in the form of Web page.

The input application 110, the edit application 120 and the output application 130 also function to generate an interface window to set operations of themselves in addition to their respective functions described above. By way of example, the digital camera AP 111 displays a view of the images imported from the digital camera 21 to provide the interface window to select the image to be output. In this embodiment, each of the interface windows is generated in the form of HTML file applicable for operation instruction through the browser 11.

The interface-providing unit 101 functions to generate the interface window which is provided for the client 10. The interface-providing unit 101 requests generation of the interface window to each of the input application 110, the edit application 120 and the output application 130 (solid line arrows in FIG. 2). In this embodiment, the request is sent not to all the applications but to the applications specified to be utilized for input-output of image. Each application sends back HTML data constituting the interface window in response to this request (broken line arrows in FIG. 2). The interface-providing unit 101 combines these HTML data into a HTML file to provide the interface window to set operations of input, edit and output.

The operation control unit 102 is activated when the user instructs to execute input-output of image. The operation control unit 102 receives this execution instruction and the operation instruction, which specifies the applications to be used for input-output, from the interface-providing unit 101. The operation control unit 102 invokes the input application 110 specified by this operation instruction to acquire the image data. Next, the operation control unit 102 transfers this image data to the specified edit application 120 and receives the result of edit. Furthermore, the operation control unit 102 transfers the result of edit to the output application 130 and causes the output application 130 to output the image. Thus, the operation control unit 102 can accomplish input-output of image by activating the respective applications specified by the operation instruction and transferring the image data between the respective applications.

C. Interface Window

Figure 3:
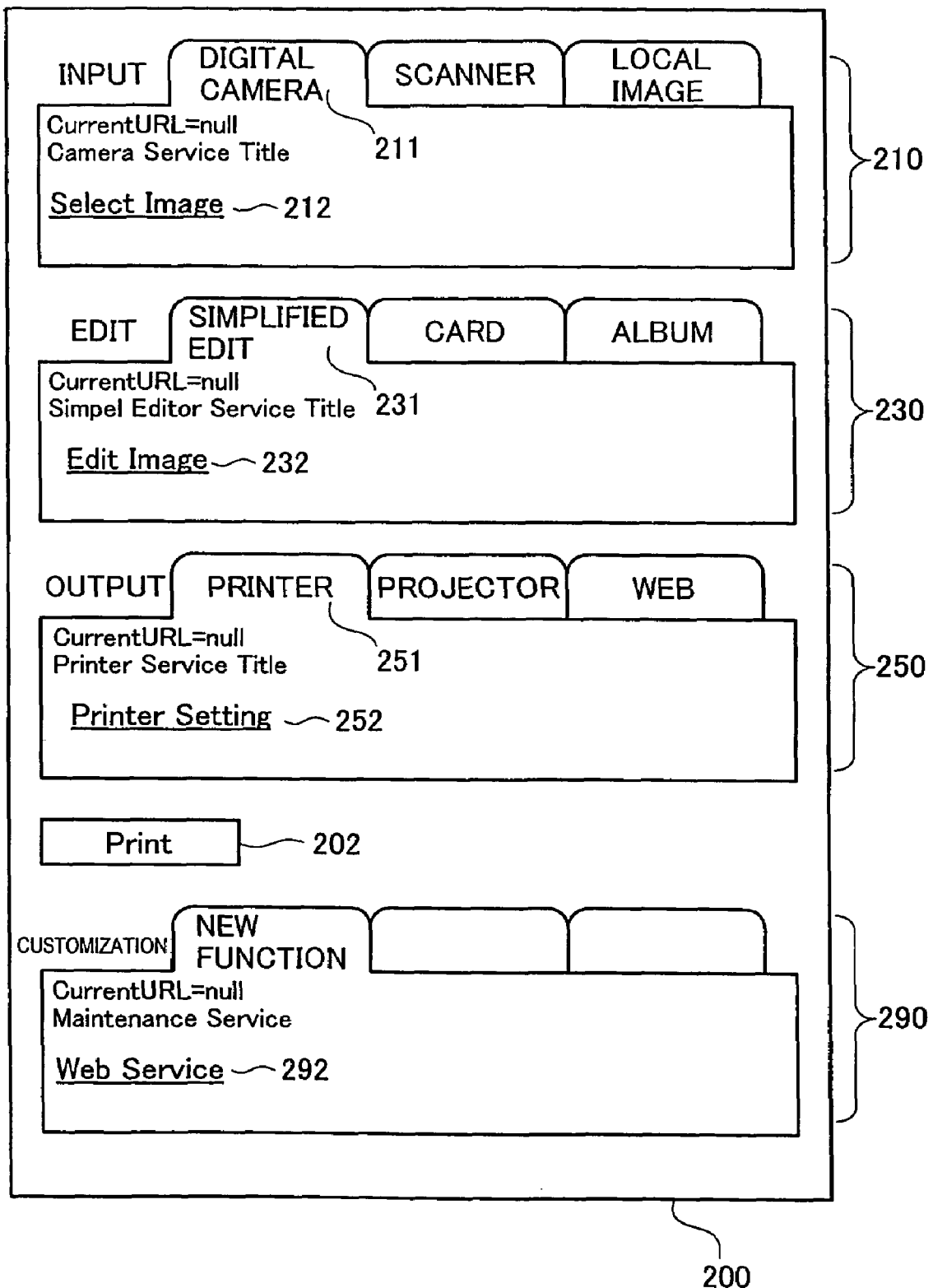
FIG. 3 is a schematic that shows an interface window utilized in the embodiment.

FIG. 3 is a schematic that shows an interface window utilized in the embodiment. FIG. 3 shows an example of window displayed in the browser 11. As described above, the interface window 200 is generated by the interface-providing unit 101. First, the transitions of the interface window 200 are described below according to the embodiment. Process to generate these windows is described later.

The interface window 200 of the embodiment is divided into several areas. An input-setting area 210 is an area to select the input application 110 and to set operations of the application. The example in FIG. 3 shows a state where the digital camera AP 111 is selected by a tab 211. In this window, a "Select Image" menu 212 is provided, and clicking this menu makes the transition to the next state.

An edit-setting area 230 is an area to select the edit application 120 and to set operations of the application. The example in FIG. 3 shows a state where the simplified edit AP 121 is selected by a tab 231. In this window, an "Edit Image" menu 232 is provided, and clicking this menu makes the transition to the next state.

An output-setting area 250 is an area to select the output application 130 and to set operations of the application. The example in FIG. 3 shows a state where the printer AP 132 is selected by a tab 251. In this window, a "Printer Setting" menu 252 is provided, and clicking this menu makes the transition to the next state.

A Print button 202 is a button for instructing to execute input-output of image. A customization area 290 is an area for customizing the system. In the example of FIG. 3, a "Web Service" menu 292 is provided, and clicking this menu enables to add a new function e.g., adding new device. The Print button 202 and the customization area 290 are generated by the interface-providing unit 101.

In the interface window 200, setting can be started with any part of the respective areas. The order of settings is not limited although the description is made, for sake of convenience of explanation, in the following order: the image to be output is set in the input-setting area 210; the method of edit is specified in the edit-setting area 230; and then the settings such as output mode are performed in the output-setting area 250. By way of example, settings can be performed in the following order: specifying of the output destination; specifying of the method of edit; and specifying of the image to be output.

Figure 4:
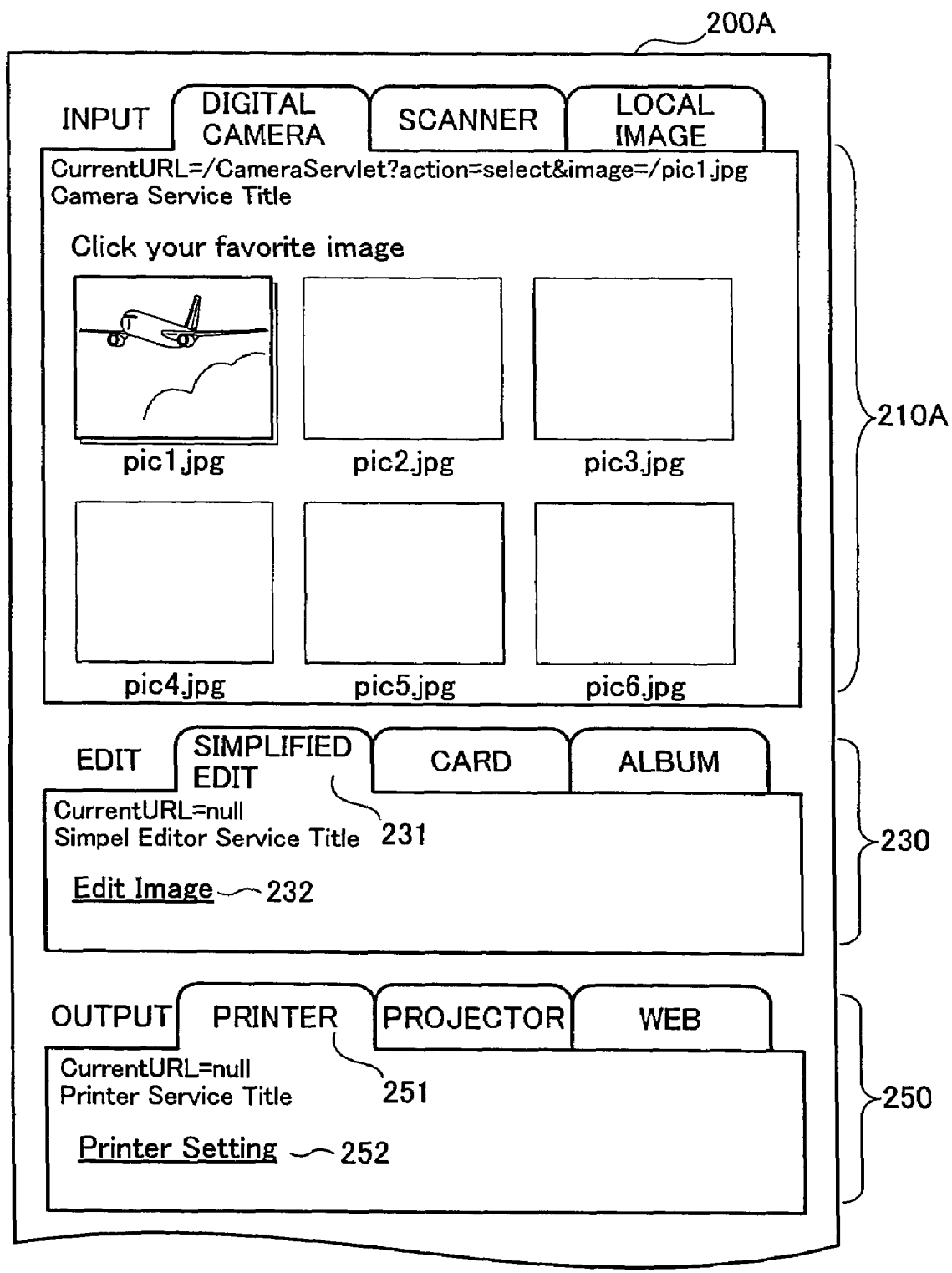
FIG. 4 is a schematic that shows a window after a transition from the interface window 200.

FIG. 4 is a schematic that shows a window after a transition from the interface window 200. In the interface window 200 (FIG. 3), clicking the "Select Image" menu 212 makes the transition to this window. In the interface window 200A, after the transition, the state of the input-setting area 210A is changed. In this embodiment, the images acquired from the digital camera 21 are listed and the image to be output can be selected. FIG. 3 exemplifies the state where six images are listed. The user can click the image to specify the object of output.

Figure 5:
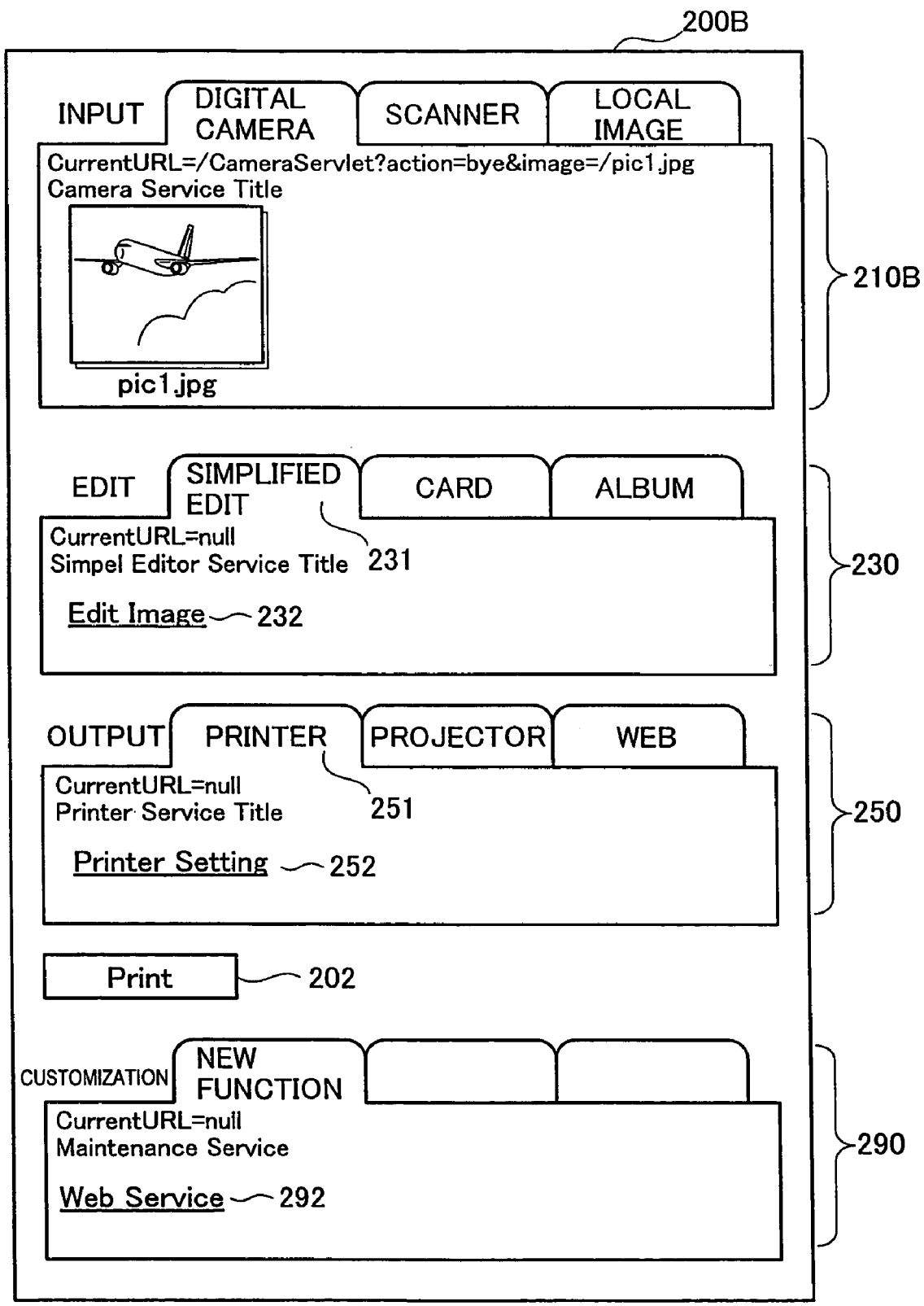
FIG. 5 is a schematic that shows a window after a transition from the interface window 200A.

FIG. 5 is a schematic that shows a window after a transition from the interface window 200A. In the interface window 200A (FIG. 4), clicking the image "pic1.jpg" makes the transition to this window. In the interface window 200B, after the transition, the state of the input-setting area 210B is changed, in which only the image selected as object of output is displayed. Although here is exemplified the case that "pic1.jpg" is selected, selecting another image makes the transition to the same type of window. Clicking the displayed image "pic1.jpg" may cause to return again to the interface window 200A.

Figure 6:
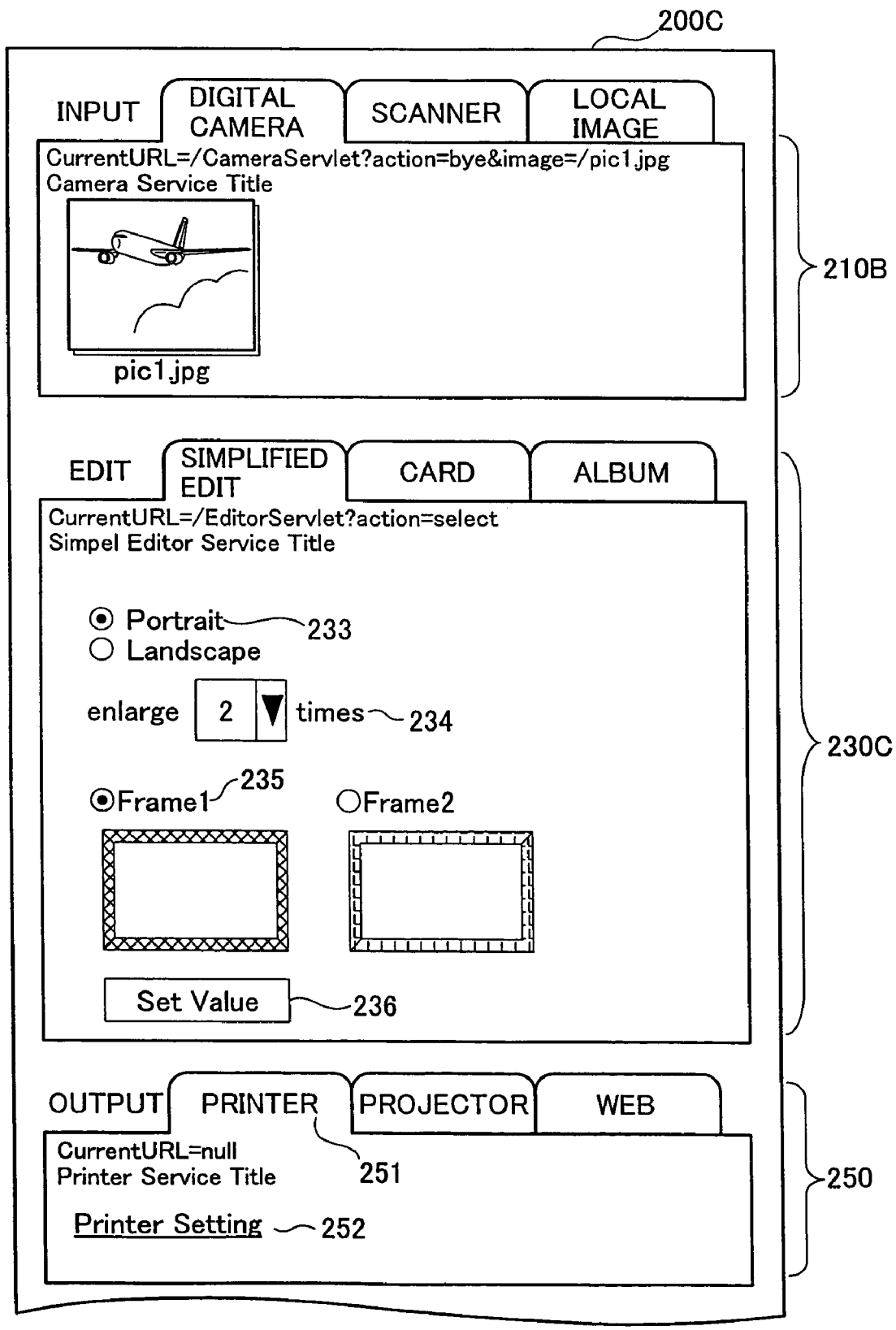
FIG. 6 is a schematic that shows a window after a transition from the interface window 200B.

FIG. 6 is a schematic that shows a window after a transition from the interface window 200B. In the interface window 200B (FIG. 5), clicking the "Edit Image" menu 232 in the edit-setting area 230 makes the transition to this window. In the interface window 200C, after the transition, the state of the edit-setting area 230C is changed, in which the setting window for simplified edit is displayed. The state of the input-setting area 210B does not change.

Provided within the setting area 230C for simplified edit are a radio buttons 233 for specifying orientation of image, a box 234 for specifying enlargement ratio, and a radio buttons 235 for specifying a frame. FIG. 6 exemplifies the state where the vertical orientation (Portrait), the enlargement ratio of two times and the Frame1 have been selected.

Figure 7:
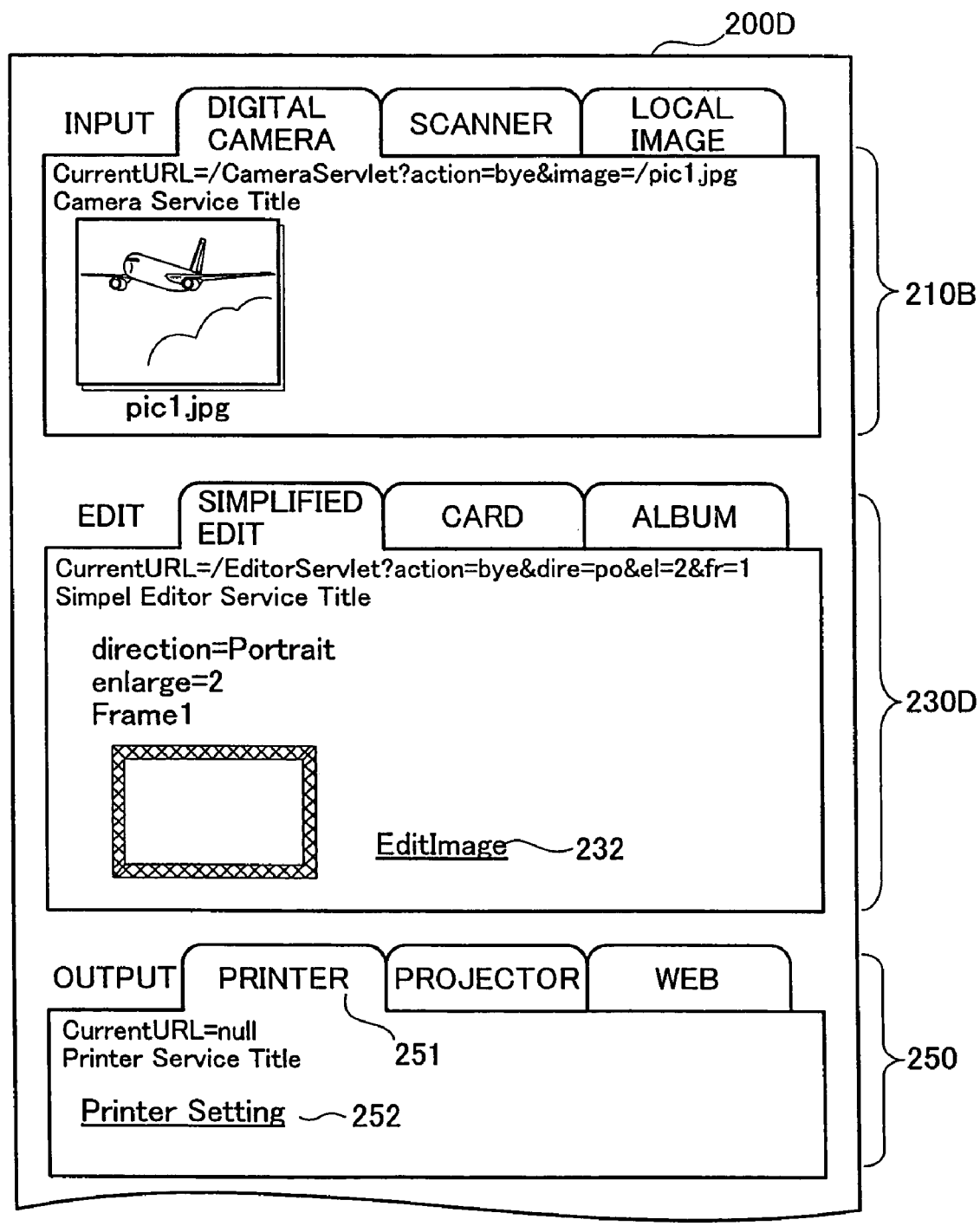
FIG. 7 is a schematic that shows a window after a transition from the interface window 200C.

FIG. 7 is a schematic that shows a window after a transition from the interface window 200C. In the interface window 200C (FIG. 6), clicking the "Set Value" menu 236 makes the transition to this window. In the interface window 200D, after the transition, the state of the edit-setting area 230D has changed, in which the details of settings of edit are displayed. In addition, the "Edit Image" menu 232 is also displayed in this window. Clicking this menu 232 causes to return again to the state of the interface window 200C.

Figure 8:
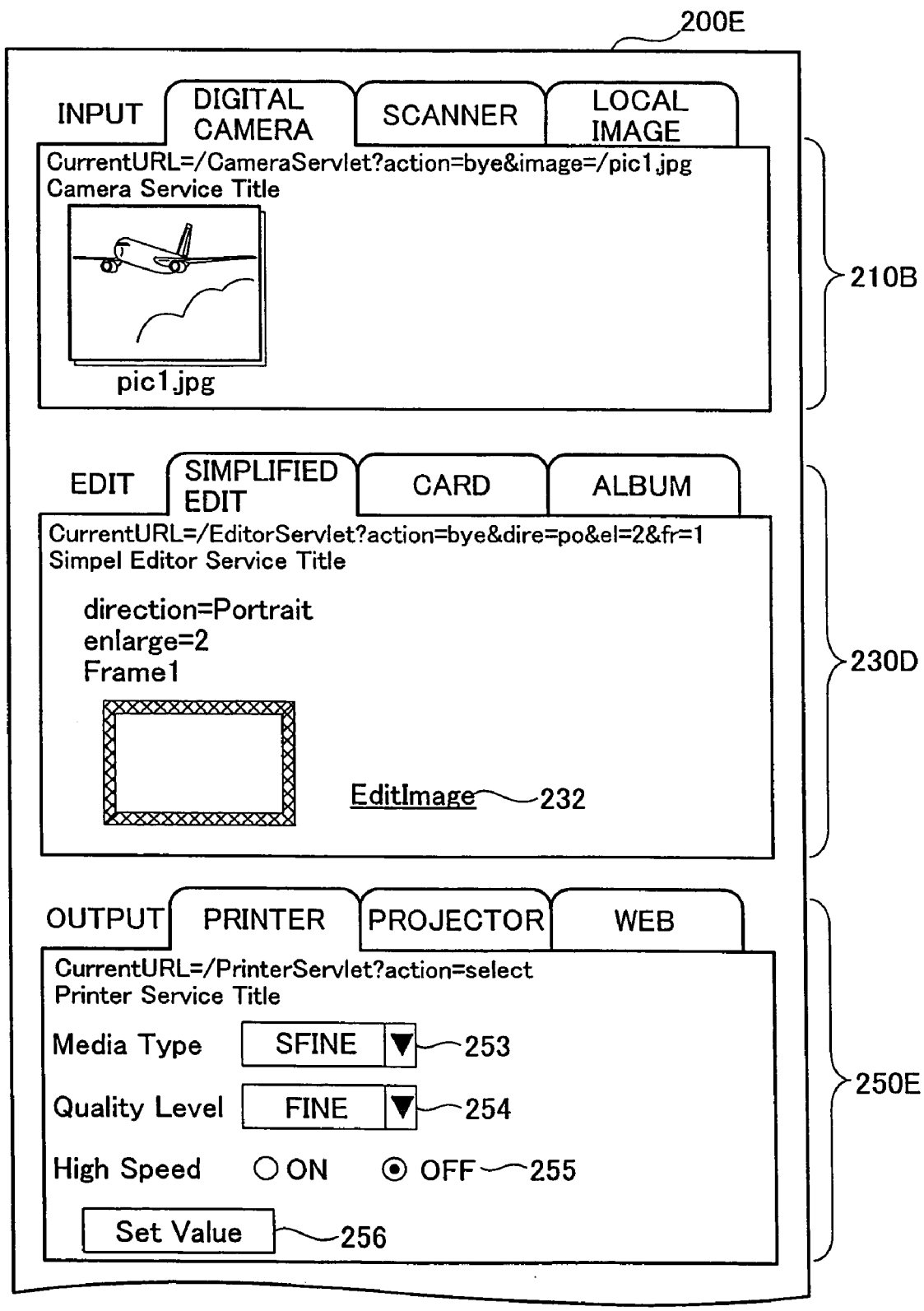
FIG. 8 is a schematic that shows a window after a transition from the interface window 200D.

FIG. 8 is a schematic that shows a window after a transition from the interface window 200D. In the interface window 200D (FIG. 7), clicking the "Printer Setting" menu 252 in the output-setting area 250 makes the transition to this window. In the interface window 200D, after the transition, the state of the output-setting area 250E is changed, in which the window for setting the printer is displayed. The states of the input-setting area 210B and the edit-setting area 230D do not change.

Provided in the output-setting area 250E are boxes 253 and 254 for setting printing paper and image quality respectively, and a radio buttons 255 for setting on/off of high-speed print. The example of FIG. 8 exemplifies the state where "SFINE (super fine)" and "FINE" are selected as printing paper and image quality respectively and high-speed print is off.

Figure 9:
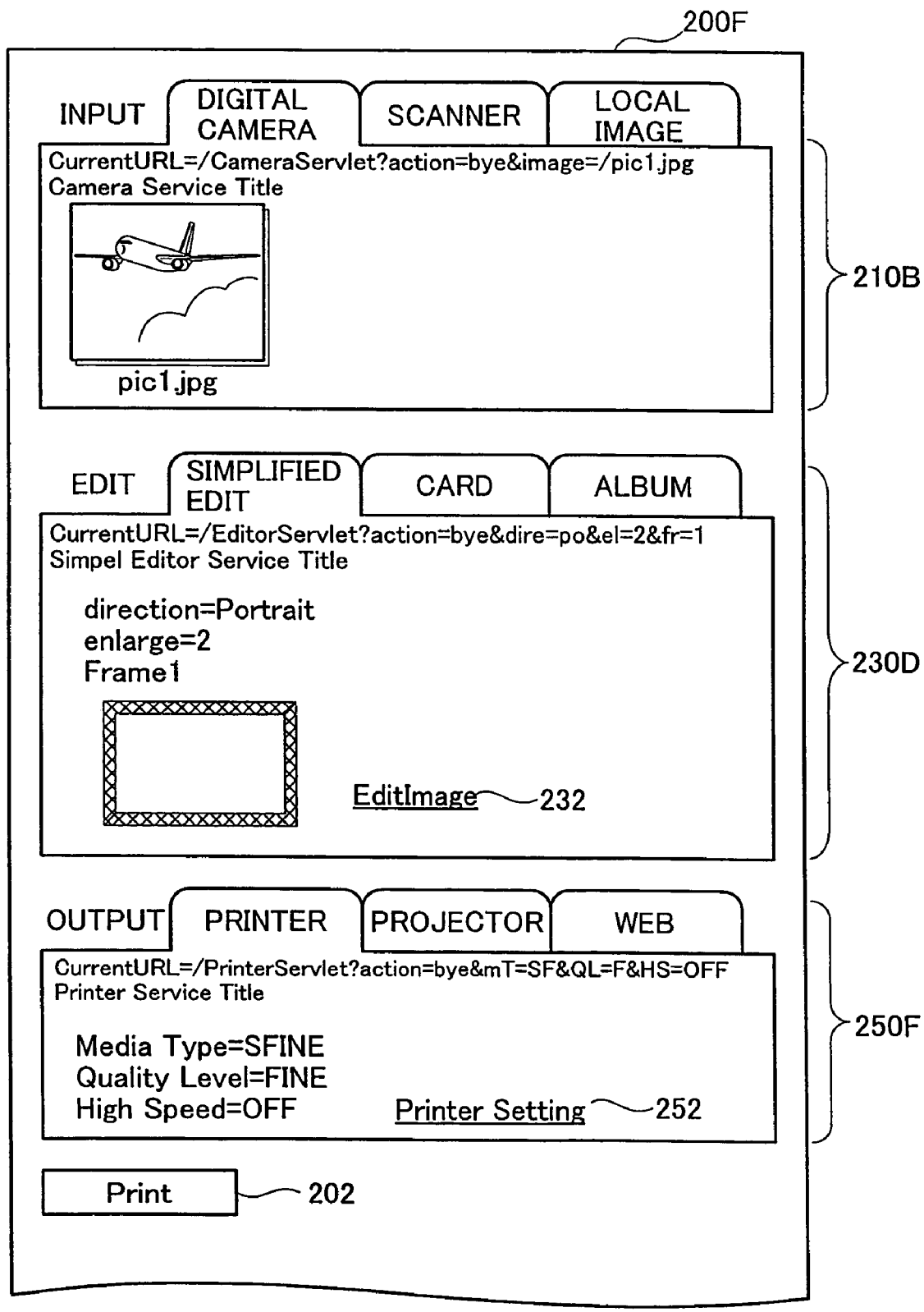
FIG. 9 is a schematic that shows a window after a transition from the interface window 200E.

FIG. 9 is a schematic that shows a window after a transition from the interface window 200E. In the interface window 200E (FIG. 8), clicking the "Set Value" menu 256 makes the transition to this window. In the interface window 200F, after the transition, the state of the output-setting area 250F is changed, in which the settings of printer are displayed. In addition, the "Printer Setting" menu 252 is also displayed in this window. Clicking this menu 252 causes to return again to the state of the interface window 200E.

After completion of the above settings, clicking the "Print" button 202 activates the following processing on the image of "pic1.jpg": input from the digital camera 21; enlarged twice; superimposed on the Frame1; and then printed in the specified print mode.

As described above, the interface of this embodiment can perform settings of input, edit and output in any order. By way of example, when the settings have been completed in the state of FIG. 9, it is possible to modify the contents of the edit-setting area 230D. In this case, if the "Edit Image" menu 232 is clicked, then the edit-setting area 230C shown in FIG. 6 is be displayed and thus the settings can be readily modified while the states of the input-setting area 210B and the output-setting area 250F are held.

D. Generation of Interface Window

Figure 10:
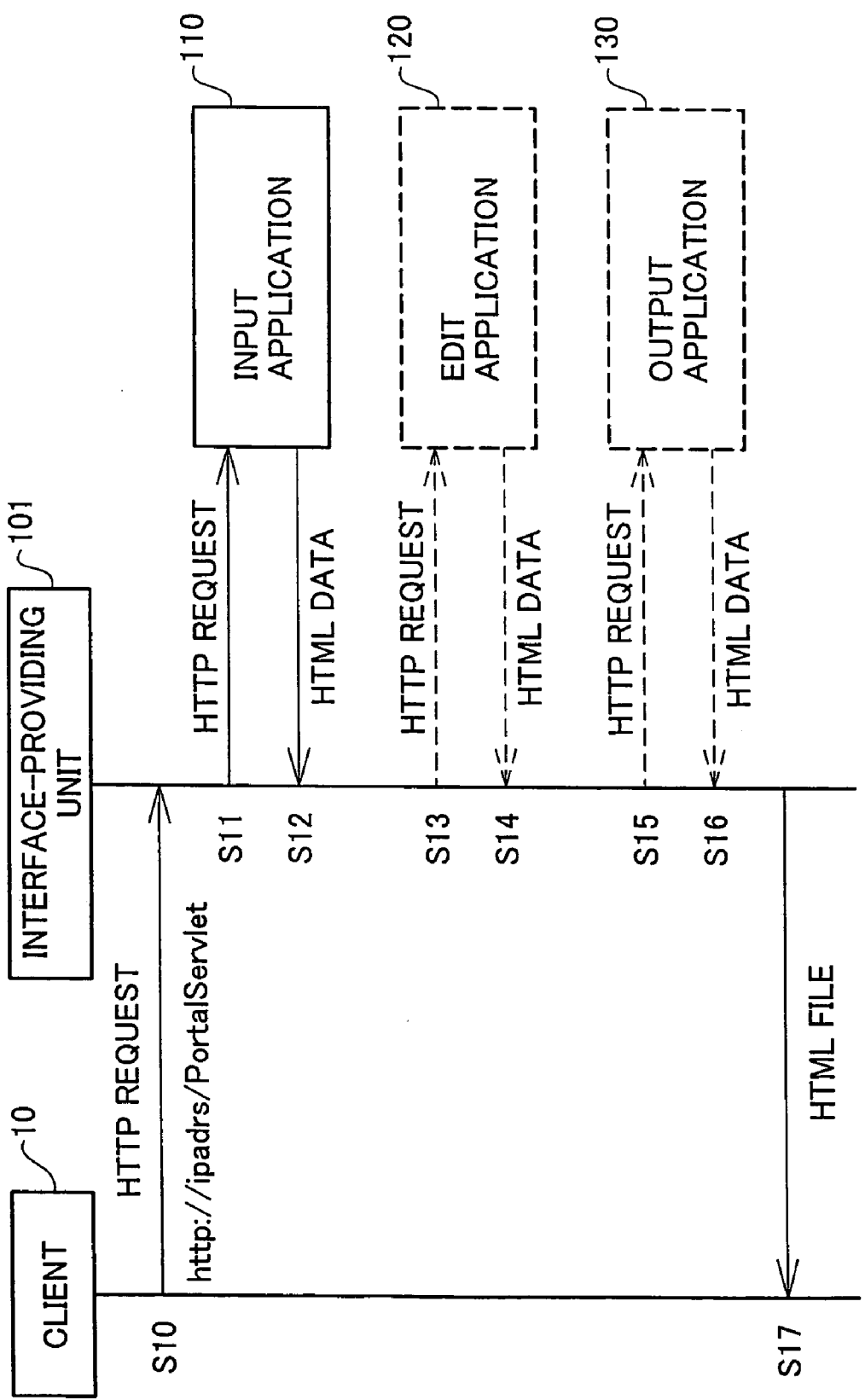
FIG. 10 is a flowchart of a generating process of the interface window.

FIG. 10 is a flowchart showing a generating process of the interface window. The user inputs the URL corresponding to the interface-providing unit 101, through the browser 11 of the client 10 to send a HTTP request, and thereby this process is initiated (step S10). Once the interface-providing unit 101 receives this request, it sends a HTTP request to one of the input applications to request generation of the interface window (step S11). The interface-providing unit 101, which manages the input application selected by the tab 211 shown in FIG. 3, sends the request to the input application.

In response to this request, each application generates HTML data to display the interface window that is used to set the operations of itself and sends back the HTML data to the interface-providing unit 101 (step S12). Here, sent back is the HTML data to display the window of the input-setting area. The generated window varies according to the contents of settings in the input-setting area as shown in FIGS. 3-9.

Hereinafter in the same way, the interface-providing unit 101 requests generation of the interface window to the edit application 120 and the output application 130, and receives HTML data (steps S13-S16). The edit application 120 sends back the HTML data to display the window of the edit-setting area, and the output application 130 sends back the HTML data to display the window of the output-setting area.

The interface-providing unit 101 combines the respective HTML data obtained as described above so as to generate the HTML file that provides the single window, as shown in FIGS. 3-9, in which the input-setting area, the edit-setting area and the output-setting area are shown. This HTML file is sent to the client 10 (step S 17), thereby presenting the interface window.

The process for generating the interface windows shown in FIG. 10 is performed whenever there occurs the need for modifying the window to be displayed in response to user's operation as shown in FIGS. 3-9. However, since each operation of the user targets at any one of the input-setting area, the edit-setting area and the output-setting area, it is required to modify only one area related to the operation in the window. For example, when the operation is made in the input-setting area as the transition from FIG. 3 to FIG. 4, it is required to update only the HTML data corresponding to the input-setting area. In such a case, the interface-providing unit 101 sends the request to the input application 110 (step S11) and receives the HTML data from the input application 110 (step S12), but omits the requests and the like (steps S13-S16) for the edit application 120 and the output application 130 as shown by the broken lines in FIG. 10. With regard to the edit-setting area and the output-setting area, the HTML data having been acquired in the previous process is diverted and combined with the HTML data of the input-setting area newly acquired in order to generate the HTML file (step S17).

Sending request and the like are performed only for the application which requires update so that it is enabled to reduce the processing time for generating the HTML file for the interface window. Of course it is applicable to adopt the configuration where the requests are sent to all of the input application 110, the edit application 120 and the output application 130 regardless of need for update.

Figure 11:
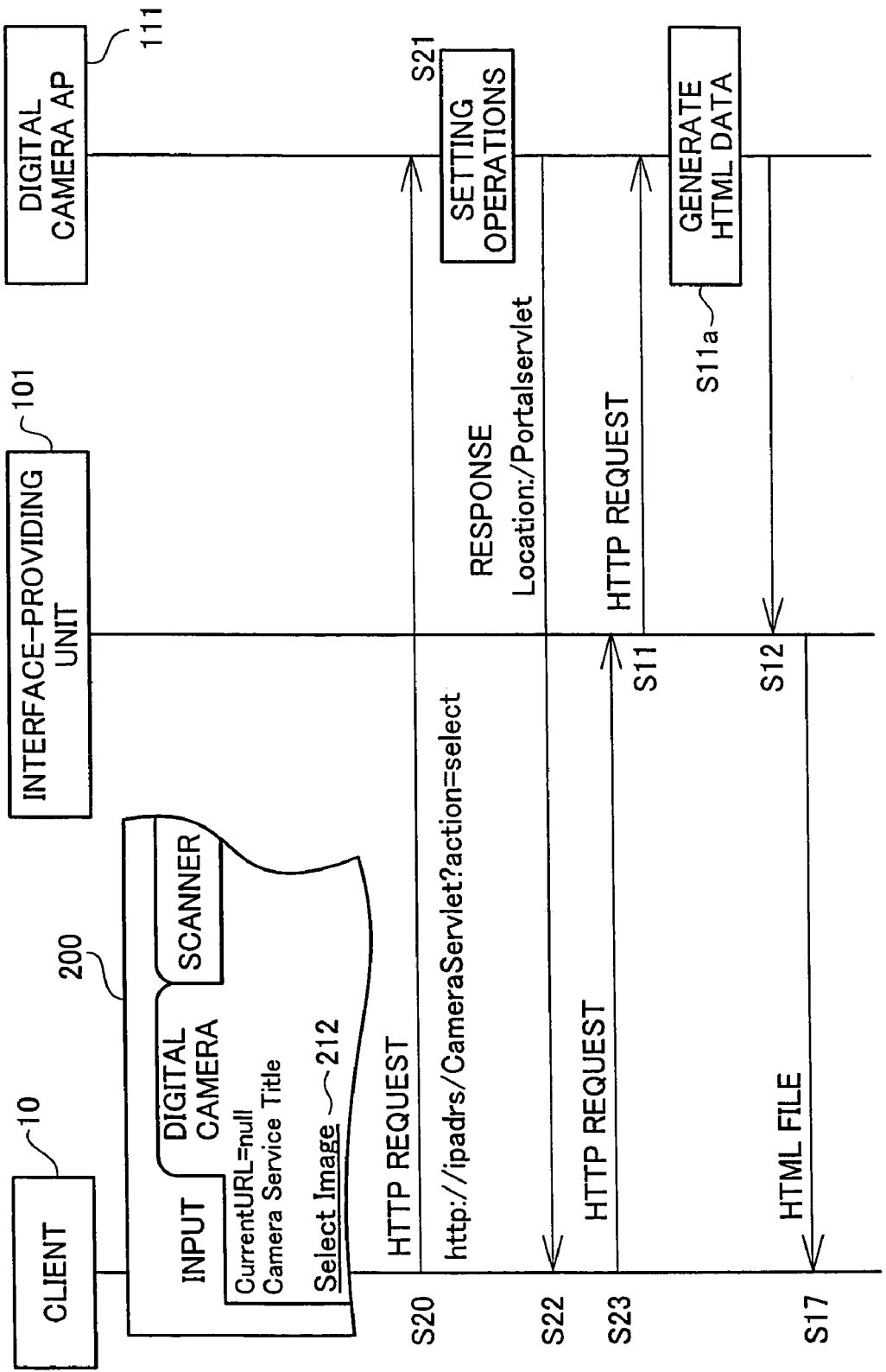
FIG. 11 is a flowchart of a process of changing the interface window in response to a click.

FIG. 11 is a flowchart of a process for changing the interface window in response to a click. Here shows an example of the transition of the window (the transition from FIG. 3 to FIG. 4) after the "Select Image" menu 212 is clicked in the interface window 200.

If the "Select Image" menu 212 is clicked in the client 10, then the HTTP request is sent to the link destination that is attached to the menu 212 (step S20). In this embodiment, the digital camera AP 111 is shown as this link destination. As described above, the input-setting area including the menu 212 is generated by the digital camera AP 111. Therefore, attached to the menu 212 is the link for returning back to the application itself which has generated the menu. Hereinafter, the link for retuning back to the generator of the link is referred to as return link.

In this embodiment, the parameter for specifying the operations of the application is added to the return link. For example, added to the menu 212 is the "action=select" parameter. The digital camera AP 111 receives this parameter in addition to the request through the return link and then sets operations according to the parameter (step S21). At this stage, it is required only to hold the contents of settings within the digital camera AP. The digital camera AP 111 can independently set the contents of the parameter and the settings of its operations corresponding to the parameter. Because the parameter used in this step has no effect on operations of the other applications and the interface-providing unit 101.

The digital camera AP 111, after setting operations, sends back to the client 10 the response to redirect the link destination to the interface-providing unit 101 (step S22). In response to this, the client 10 sends the HTTP request to the interface-providing unit 101 (step S23).

The interface-providing unit 101, once receiving this request, generates the interface window as shown in FIG. 10. The interface-providing unit 101 sends the HTTP request to the digital camera AP requiring update of the window (step S11). Since the settings have been updated by the process of step S21, the digital camera AP 111 generates the HTML data according to this update (step S11a) and sends back the HTML data to the interface-providing unit 101 (step S12). The interface-providing unit 101 combines this HTML data with the prior and existing HTML data of the edit-setting area and the output-setting area to generate the HTML file for the new interface window and send it to the client 10 (step S17). Thus, after the "Select Image" menu 212 is clicked, the interface window shown in FIG. 4 is generated.

From the viewpoint of setting operations of the digital camera AP 111, it is possible to omit the redirection of step S22. However, in this case, the displayed interface window includes only the input-setting area with lacking the edit-setting area and the output-setting area when the HTML data generated by the digital camera AP 111 is sent back to the client 10. In this embodiment, the redirection is performed after operation is set through the return link, and which enables to provide the interface window on which the contents of settings are reflected while maintaining the state where the windows of input, edit and output can be looked through.

Although the description has been made with taking as an example the operations of the digital camera AP 111, the other applications also operate in the same way.

E. Holding of Settings

Figure 12:
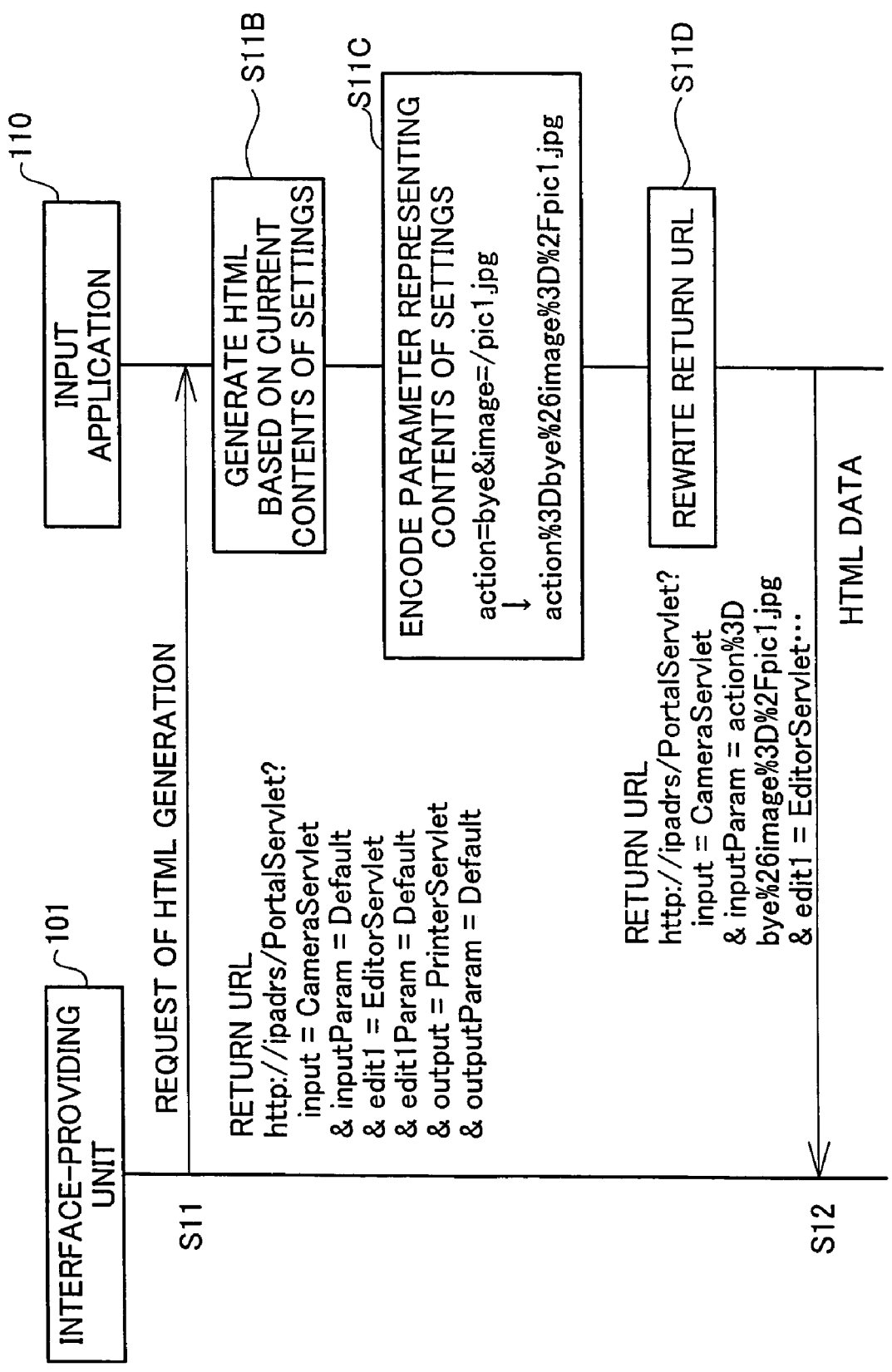
FIG. 12 is a flowchart of a process of the application program generating the interface window.

FIG. 12 is a flowchart of a process where the application generates the interface window. Here shows an example case where the input application 110 generates the HTML data of the input-setting area. This process corresponds to the process from S11 to S12 of FIG. 10.

In this embodiment, when this HTML file is generated, the URL whose parameters include the settings of operations of the respective applications is also generated. The interface-providing unit 101, when requesting generation of the interface window to the input application 110, also provides the return URL (step S11). The return URL represents an URL or a destination to which the input application 110 returns the HTML file as response. As shown in FIG. 12, the return URL includes the following parameters.

"input=CameraServlet" means that the digital camera AP 111 is used as input application 110. The value of the parameter is changed to ScanServlet, LocalImageServlet and the like depending on the type of input application 110.

"inputParam=Default" is a parameter for setting the operation of the input application 110. In this embodiment, the parameter included in the return link shown in FIG. 11 is used. "Default" means that there is performed no setting of operation.

"edit1=EditorServlet" means that the simplified edit AP 121 is used as edit application 120. "edit1Param=Default" is a parameter for setting the operation of the edit application 120.

"output=PrinterServlet" means that the printer AP 132 is used as output application 130. "outputParam=Default" is a parameter for setting the operation of the output application 130.

The input application 110, once receiving the request from the interface-providing unit 101 (step S11), generates the HTML data of the input-setting area based on the current contents of settings (step S11B). Next, the input application encodes the parameter representing the contents of settings (step S11C) and rewrites the return URL (step S11D).

FIG. 12 shows an example of encode. By way of example, in this embodiment, the state of the input-setting area 210B of FIG. 5 is represented by the parameter "action=bye&image=/pic1.jpg." Thus, the input application 110 rewrites the value of the parameter "inputParam" for setting its operation within the return URL to "action=bye&image=/pic1.jpg." At that time, it is well-known that "=" and "&" cannot be used within the parameter under the description rule of URL. The input application 110 rewrites the return URL with "=" and "&" encoded to "%3D" and "%26" respectively according to the encode rule on the Internet. "inputParam" is rewritten while the other parameters is held.

The rewritten return URL is shown in FIG. 12. As shown in FIG. 12, the value of "inputParam" is rewritten to "action%3Dbye%26image%3D%2Fpic1.jpg." As a result, the information representing the current contents of settings of the input application 110 is incorporated into the return URL. The input application 110, after rewriting the URL, sends back the HTML data to the interface-providing unit 101 (step S12). The interface-providing unit 101 also receives the parameter within this return URL.

The edit application 120 and the output application 130 also perform the similar process. The edit application 120 rewrites the parameter "edit1Param" while the output application 130 rewrites the parameter "outputParam." As a result of the above processes, the information related to the types of applications to be used for input, edit and output and their contents of operations is included in the return URL when the HTML data for the interface is received from the input application 110, the edit application 120 and the output application 130.

The interface-providing unit 101 presents this return URL together with the interface window to the client 10. This enables the contents of settings to be readily stored by bookmark function of the browser 11. Furthermore, transferring the URL as electronic data to anyone else also enables the contents of settings to be readily transmitted. The interface-providing unit 101, when the URL includes these parameters, parses the contents of the parameters to readily reproduce these settings. The function for holding the contents of settings as the parameters of URL is optional for achieving input-output of image and therefore may be omitted. The return URL including no parameter or the unchanging return URL, which parameters are not rewritten by the respective applications, may be used.

E. Effect

According to the image input-output system of the embodiment described above, the user can specify the applications that are used for input, edit and output, thereby causing them to perform input-output of image. The functions of controlling device and editing image are provided by the server-side program 100, and therefore these software need not be installed into the client 10.

In the system of the embodiment, it is possible to set operations via the browser 11. According to the interface window for setting operations, it is possible to look through the contents of settings of input, edit and output and therefore to readily comprehend the contents of settings, and it is possible to perform settings in a simple procedure. Furthermore, according to the interface window of the embodiment, it is possible to set input, edit and output in any order, thereby improving convenience in setting. By way of example, it is possible to change the settings of input while holding the settings of edit and output, and therefore it is possible to replace the image to be printed while printing in the constant settings of edit and output.

G. Modifications

The embodiment exemplifies that each of the devices is connected via the local area network LAN (see FIG. 1). The system of this embodiment can be also applied to the case where each of the devices is scattered on the Internet. That is applicable as long as the respective applications are able to control the devices on the Internet. In the same way, it is possible to include the device connected locally to the home gateway 30, the client 10, the server on the Internet, and the like if the application can control the device.

Although the embodiment exemplifies that all of the applications are incorporated into the server-side program 100, each of the applications may be scattered on the Internet or may be provided within the client 10.

Although the transfers of the image between each of the applications are performed in the JPEG format in this embodiment, any format may be applied to the image. The format used for the transfer from the input application 110 to the edit application 120 may differ from the format used for the transfer from the edit application 120 to the output application 130. However, if a common format is used by all of the applications, it is advantageously possible to combine the applications freely without the need to consider compatibility of format.

Although the edit application 120 is used in the embodiment, this application may be omitted. Alternately, a plurality of edit applications 120 may be available.

Although various embodiments of the invention have been described, it should be noted that the invention is not limited to these embodiments and may include various configurations without departing from the spirit of the invention. By way of example, although the description has been made with taking as an example input-output of image in the embodiment, the invention can be also applied to a system for performing input-output of sound.

What is claimed is:

1. An input-output control device, comprised by a gateway device, for performing input-output of audio-visual data between any of a plurality of devices, within a Local Area Network environment, which perform input-output of said audio-visual data for reproducing image or sound, said input-output control device comprising:
    a processor;
    a computer readable medium under the control of said processor;
    individual functional units that are provided to control the plurality of devices, respectively, each of the individual functional units generating HTML data;
    an input-output unit for sending and receiving said audio-visual data and a command to and from the individual functional units that operate the plurality of devices, respectively;
    an instruction input unit for receiving from a client device a selection instruction for selecting individual functional unit respectively, which is to be used for one of a plurality of steps from input to output of said audio-visual data, and receiving from the client device an operation instruction specifying operation of the individual functional unit; and
    an operation control unit for operating each of said selected individual functional units according to said plurality of steps and transferring said audio-visual data that is output from one individual functional unit to another individual functional unit to be used for a next step;
    wherein the instruction input unit generates, by combining the HTML data generated by the individual functional units, a Web page including an interface window for allowing a user to input the operation instruction for the individual functional units, provides the Web page to the client device, and receives the operation instruction from the client device through the interface window,
    the HTML data generated by each individual functional unit contains a return link that represents a link to the individual functional until itself, and the return link has parameters that specify the operation of the individual functional unit, and
    upon receiving from the client device a HTTP request based on the return link, the individual functional unit establishes the operation of the individual functional unit itself according to the parameters included in the return link, and returns to the client device a response of the HTTP request to redirect a destination of the return link to the instruction input unit.

2. The input-output control device according to claim 1 wherein a part of the individual functional units, which is subject to operation of said input-output unit, instruction input unit and operation control unit, performs edit of said audio-visual data.

3. The input-output control device according to claim 1, wherein said instruction input unit also inputs operation instruction to specify an operation of said respective individual functional unit, and said input-output unit transfers a command corresponding to said operation instruction to said individual function unit.

4. The input-output control device according to claim 1, wherein said instruction input unit specifies said individual functional unit in any order regardless of order of execution of the plurality of steps.

5. The input-output control device according to claim 1, wherein said instruction input unit performs said input via an interface window in which designations of the individual functional units for all of said respective steps are shown.

6. A recording medium recording a computer program to input-output of audio-visual data between any of a plurality of devices within a Local Area Network environment, which perform input-output of said audio-visual data for reproducing image or sound, said computer program causing a computer comprised by a gateway device to achieve functions of:
    generating, by each of a plurality of applications that are provided to control the plurality of devices, respectively, HTML data;
    sending and receiving said audio-visual data and a command to and from the applications which are individually provided in order to operate the respective devices;
    receiving from a client device, by an instruction input unit, a selection instruction for selecting an application respectively, which is to be used for one of a plurality of steps from input to output of said audio-visual data, and receiving from the client device an operation instruction specifying operation of the application; and
    operating each of said selected applications according to said plurality of steps and transferring said audio-visual data that is output from one application to another application to be used for a next step;
    wherein the computer program further comprises:
        generating, by combining the HTML data generated by the applications, a Web page including an interface window for allowing a user to input the operation instruction for the applications, providing the Web page to the client device, and receiving the operation instruction from the client device through the interface window;
        the HTML data generated by each application contains a return link that represents a link to the application until itself, and the return link has parameters that specify the operation of the application, and
        upon receiving from the client device a HTTP request based on the return link, the application establishes the operation of the application itself according to the parameters included in the return link, and returns to the client device a response of the HTTP request to redirect a destination of the return link to the instruction input unit.

7. An input-output control method for performing, by a gateway device, input-output of audio-visual data between any of a plurality of devices within a Local Area Network environment, which perform input-output of said audio-visual data for reproducing image or sound, said method comprising:
    generating, by each of a plurality of applications that are provided to control the plurality of devices, respectively, HTML data;
    sending and receiving said audio-visual data and a command to and from the applications which are individually provided in order to operate the respective devices;

receiving from a client device, by an instruction input unit, a selection instruction for selecting application respectively, which is to be used for one of a plurality of steps from input to output of said audio-visual data; and receiving from the client device an operation instruction specifying operation of the application; and operating each of said selected applications according to said plurality of steps and transferring said audio-visual data that is output from one application to another applications to be used for a next step;

said method further comprising:

generating, by combining the HTML data generated by the applications, a Web page including an interface window for allowing a user to input the operation instruction for the applications, providing the Web page to the client device, and receiving the operation instruction from the client device through the interface window;

the HTML data generated by each application contains a return link that represents a link to the application until itself, and the return link has parameters that specify the operation of the application, and upon receiving from the client device a HTTP request based on the return link, the application establishes the operation of the application itself according to the parameters included in the return link, and returns to the client device a response of the HTTP request to redirect a destination of the return link to the instruction input unit.

* * * * *